March 30, 1965  J. P. SOLTAU  3,175,505

PUMPS

Filed March 20, 1963

United States Patent Office 3,175,505
Patented Mar. 30, 1965

3,175,505
PUMPS
John Peter Soltau, Dorridge, Solihull, England, assignor to Joseph Lucas (Industries) Limited, Birmingham, England
Filed Mar. 20, 1963, Ser. No. 266,629
Claims priority, application Great Britain, Mar. 28, 1962, 11,832/62
3 Claims. (Cl. 103—135)

This invention relates to pumps of the kind comprising in combination a pump body defining a cylindrical chamber having an inlet and an outlet, a cylindrical rotor mounted for rotation within the chamber about an axis which is eccentric relative to the chamber, a plurality of angularly spaced vanes slidable within the rotor, said vanes being adapted to maintain wiping contact with the peripheral wall of the chamber as the rotor is rotated, and to transfer fluid from the inlet to the outlet through the space defined between the rotor and the peripheral wall of the chamber.

The object of the invention is to provide such a pump in a convenient form.

According to the invention in a pump of the kind specified the inlet and outlet are formed in an end, or the ends respectively of the chamber at opposite sides of a diameter of the chamber passing through the point where the rotor is nearest the wall of the chamber, in positions to be partially overlapped by the end or ends of the rotor intermediate the blades, ports which are adapted to communicate in turn with the inlet and outlet as the rotor is rotated, said ports being in communication with passages in the rotor leading to the periphery thereof.

Figure 1:
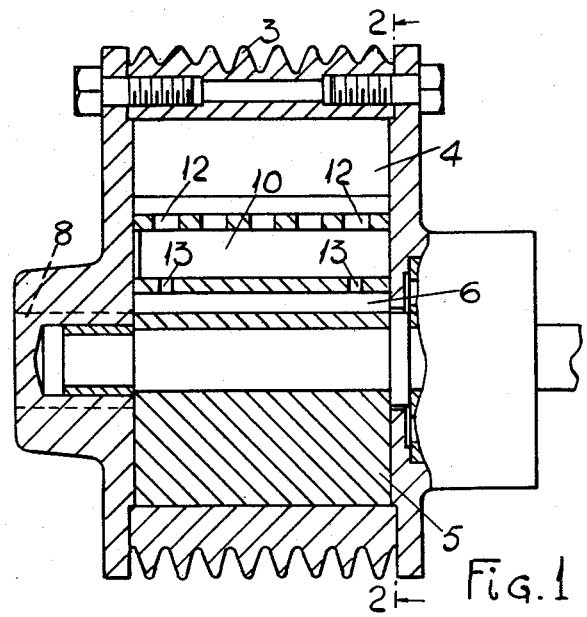
Figure 2:
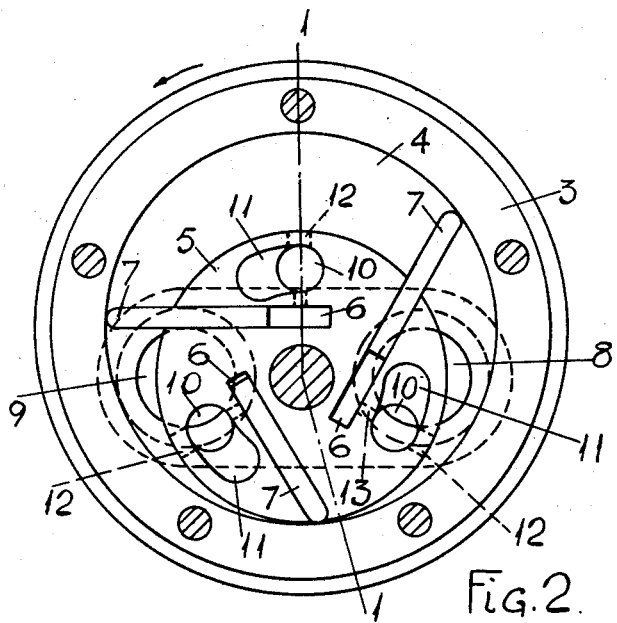

In the accompanying drawings FIGURE 1 is a sectional side view of an example of the invention, the section being taken in the line 1—1 of FIGURE 2, and FIGURE 2 is a section on the line 2—2 of FIGURE 1.

Referring to the drawings there is provided a pump body 3 defining a cylindrical chamber 4. Mounted for rotation about a relatively eccentric axis within the chamber 4 is a cylindrical rotor 5 of substantially equal axial length. The axis of the rotor is so disposed that only a small clearance is left between the periphery of the rotor and the chamber wall. Moreover, in the periphery of the rotor are formed three equi-angularly spaced slots 6 which extend inwardly at approximately 30° to radii of the rotor passing through the points where the slots break the surface respectively. In each slot is mounted one of three slidable vanes 7 respectively the outer edges of which are held in wiping contact with the chamber wall as the rotor is rotated either by springs (not shown) and/or centrifugal force.

In one end wall of the chamber 4 is formed a circular inlet port 8 and a circular outlet port 9 which are disposed at opposite sides of a diameter of the chamber passing through the point where the rotor 5 is nearest the chamber wall (i.e. a vertical diameter as viewed in FIGURE 2). Moreover, the centres of the ports 8 and 9 conveniently lie on the diameter of the rotor at right angles to the aforesaid diameter of the chamber, and are arranged to be partially covered by the one end of the rotor.

In the rotor and extending parallel to its axis are three equi-angularly spaced bores 10 which are disposed approximately mid-way angularly between the outer ends of the slots 6. Each bore 10 at its end adjacent the inlet and outlet is widened into an arcuate port 11 which is arranged to communicate in turn with the inlet and outlet as the rotor is rotated. Furthermore in the periphery of the rotor are formed three series of longitudinally spaced radial ports 12 communicating with the three bores 10 respectively. Each bore may also communicate with the inner end of the slot 6 immediately in front of it (as considered in the direction of rotation of the rotor) through further radially extending ports 13.

In use, as a vane 7 passes over the inlet 8 there is defined between this vane and the next succeeding vane a space which gradually increases in volume as the rotor rotates until the next vane passes over the inlet. As a result fluid will be drawn through the exposed part of the inlet into the space between the rotor and chamber wall. However, immediately behind the vane is the leading edge of the arcuate port 11 in the rotor which communicates with the inlet. Due to centrifugal forces acting to expel fluid from the bore 10 through the radial ports 12, fluid is also sucked into the bore and discharged to the space with the result that filling of the space is improved.

In a similar manner the space between the same two vanes gradually diminishes whilst in communication with the outlet 9 so as to cause the fluid to be discharged therethrough.

It will be understood that, if desired, the inlet and outlet could be formed in opposite end walls of the chamber 4, provided that they lie at opposite sides of a diameter of the chamber passing through the point where the rotor is nearest the chamber wall.

Having thus described my invention what I claim as new and desire to secure by Letters Patent is:

1. A fluid pump comprising, in combination, a pump body defining a cylindrical chamber, a cylindrical rotor mounted for rotation within the chamber, about an axis which is off-set relative to the axis of the chamber, an inlet to the chamber defined in the body, an outlet from the chamber defined in the body, said inlet and outlet being at opposite sides of a diametral plane of the chamber said plane also passing through a point at which the rotor is nearest to the cylindrical chamber wall, said inlet and outlet being partially overlapped by an end of the rotor, a plurality of angularly spaced vanes slidable within the rotor, said vanes being adapted to maintain wiping contact with the cylindrical chamber wall as the rotor rotates, and ports in the rotor which are adapted to communicate in turn with the inlet and outlet as the rotor rotates, and the rotor defining passages affording communication between the periphery of the rotor and the ports respectively.

2. A fluid pump comprising in combination, a pump body defining a cylindrical chamber, a cylindrical rotor mounted for rotation within the chamber, about an axis which is offset relative to the axis of the chamber, an inlet to the chamber defined in the body, an outlet from the chamber defined in the body, said inlet and outlet being at opposite sides of a diametral plane of the chamber said plane also passing through a point at which the rotor is nearest to the cylindrical chamber wall, said inlet and outlet being partially overlapped by an end of the rotor, a plurality of angularly spaced vanes slidable within the rotor, said vanes being adapted to maintain wiping contact with the cylindrical chamber wall as the rotor rotates, and arcuate ports in the rotor, bores extending through the rotor parallel to its axis and communicating with the ports respectively, radially extending passages in the rotor and affording communication between the bores in the rotor and the periphery of the rotor respectively, said ports in the rotor being adapted to communicate in turn with the inlet and the outlet as the rotor rotates.

3. A fluid pump comprising in combination, a pump body defining a cylindrical chamber, a cylindrical rotor mounted for rotation within the chamber, about an axis which is off-set relative to the axis of the chamber, an inlet to the chamber defined in the body, an outlet from the chamber defined in the body, said inlet and outlet being at opposite sides of a diametral plane of the chamber said plane also passing through a point at which the rotor is nearest to the cylindrical chamber wall, said inlet and outlet being partially overlapped by an end of the rotor, a plurality of angularly spaced vanes slidable within the rotor, said vanes being adapted to maintain wiping contact with the cylindrical chamber wall as the rotor rotates, and arcuate ports in the rotor, bores extending through the rotor parallel to its axis and communicating with the ports respectively, radially extending passages in the rotor and affording communication between the bores in the rotor and the periphery of the rotor respectively, said ports in the rotor being adapted to communicate in turn with the inlet and the outlet as the rotor rotates, slots formed in the rotor and slidingly accommodating the vanes respectively, and further passages in the rotor each such further passage affording communication between one of the slots and adjacent one of the bores in the rotor respectively.

References Cited by the Examiner

UNITED STATES PATENTS

| | | | |
|---|---|---|---|
| 1,102,742 | 7/14 | Hauer | 91—138 |
| 1,104,070 | 7/14 | Overly | 91—138 |
| 1,273,041 | 7/18 | Cummings | 103—138 |
| 2,187,088 | 1/40 | Malan | 91—138 |
| 2,743,090 | 4/56 | Malan | 103—136 |
| 2,779,293 | 1/57 | Lung | 103—136 |
| 2,825,290 | 3/58 | Bakker | 103—136 |
| 3,102,494 | 9/63 | Adams | 91—138 |

LAURENCE V. EFNER, *Primary Examiner.*

JOSEPH H. BRANSON, JR., *Examiner.*